United States Patent
Jidhage et al.

(10) Patent No.: US 10,855,382 B2
(45) Date of Patent: Dec. 1, 2020

(54) METHOD OF CALIBRATING AN ANTENNA SYSTEM

(71) Applicant: Telefonaktiebolaget LM Ericsson (publ), Stockholm (SE)

(72) Inventors: Henrik Jidhage, Mölndal (SE); Christer Engdahl, Särö (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 192 days.

(21) Appl. No.: 16/303,496

(22) PCT Filed: May 26, 2016

(86) PCT No.: PCT/EP2016/061904
§ 371 (c)(1),
(2) Date: Nov. 20, 2018

(87) PCT Pub. No.: WO2017/202469
PCT Pub. Date: Nov. 30, 2017

(65) Prior Publication Data
US 2020/0322068 A1 Oct. 8, 2020

(51) Int. Cl.
*H04B 17/12* (2015.01)

(52) U.S. Cl.
CPC .................. *H04B 17/12* (2015.01)

(58) Field of Classification Search
CPC ........ H04B 17/11; H04B 17/12; H04B 17/21; H04B 17/24; H04B 17/26
See application file for complete search history.

(56) References Cited

U.S. PATENT DOCUMENTS

| 6,037,898 A | 3/2000 | Parish et al. |
| 6,295,027 B1 | 9/2001 | Wixforth et al. |

(Continued)

FOREIGN PATENT DOCUMENTS

| EP | 2 667 217 A1 | 11/2013 |
| WO | 2012/074446 A1 | 6/2012 |

OTHER PUBLICATIONS

International Search Report and Written Opinion issued in International Application No. PCT/EP2016/061904, dated Jan. 31, 2017, 10 pages.
Shipley, C. et al., "Mutual Coupling-Based Calibration of Phased Array Antennas", IEEE, 2000, pp. 529-532.

(Continued)

*Primary Examiner* — Nguyen T Vo
(74) *Attorney, Agent, or Firm* — Patent Portfolio Builders, PLLC

(57) ABSTRACT

A method (20) of calibrating an antenna system (10) comprising a number of antenna elements is provided. The method (20) is performed in a control device (11) and comprises transmitting (21) a signal from a first reference antenna element selected among the antenna elements; measuring (22) the signal in two or more calibration antenna elements selected among the remaining antenna elements, and obtaining a first set of corresponding number of measurement values; repeating (23) the transmitting (21) and measuring (22) at least for a second reference antenna element different than the first reference antenna element, thereby obtaining a second set of corresponding number of measurement values, calculating (24) for each calibration antenna element j a correction value (A), based on the at least first and second sets of measurement values, thereby obtaining a correction matrix comprising for row i correction values for calibration antenna elements j relative antenna element k with antenna element i as the reference antenna element; performing (25) an optimization procedure using as input the correction matrix, wherein each column, (Continued)

except one, is multiplied with a respective constant $C_i$, thereby obtaining, for each row of the correction matrix, a respective optimized constant (B); and calculating (26) a correction value $\Delta t_i$ for each antenna element based on the respective optimized constant (B). A control device, computer program and computer program products are also provided.

16 Claims, 7 Drawing Sheets

(56) References Cited

U.S. PATENT DOCUMENTS

| | | | |
|---|---|---|---|
| 2001/0016505 A1* | 8/2001 | Rexberg | H01Q 3/267 455/562.1 |
| 2005/0239506 A1 | 10/2005 | Li | |
| 2009/0196365 A1* | 8/2009 | Takano | H04L 25/0206 375/260 |

OTHER PUBLICATIONS

Aumann, H. et al., "Phased Array Antenna Calibration and Pattern Prediction Using Mutual Coupling Measurements", IEEE Transactions on Antennas and Propagation, vol. 37, No. 7, Jul. 1989, pp. 844-850.

Vieira, J. et al., "Reciprocity calibration methods for Massive MIMO based on antenna coupling", Lund University, Sweden, 2014, 6 pages.

* cited by examiner

METHOD OF CALIBRATING AN ANTENNA SYSTEM

CROSS REFERENCE TO RELATED APPLICATION(S)

This application is a 35 U.S.C. § 371 National Stage of International Patent Application No. PCT/EP2016/061904, filed May 26, 2016, designating the United States.

TECHNICAL FIELD

The technology disclosed herein relates generally to the field of antenna systems, and in particular to a method of calibrating an antenna system, a control device, computer program and computer program products.

BACKGROUND

Antenna systems for e.g. wireless communication need to be properly calibrated in order to work with best possible performance. Having calibrated systems are becoming increasingly important since, in future wireless communication systems, the number of branches increases and since beamforming is to be supported.

Calibration methods using mutual coupling are known, i.e. methods based on electromagnetic interaction between antenna elements in an antenna array. These calibration methods work well for symmetrical antenna arrays where identical coupling occurs between several elements by virtue of symmetry. Specifically, since the antenna elements are symmetrically placed having the same distance to each neighboring antenna element, the mutual coupling is identical for all elements.

The symmetry-based calibration methods work well for larger arrays, e.g. radars with several hundreds of antenna elements. Such large arrays comprise a large number of central antenna elements that are truly symmetrical and considerably fewer edge antenna elements, which the calibration methods simply assume to be symmetrical.

In these large arrays the central antenna elements outnumber the edge antenna elements and the impact of assuming that the edge elements are also symmetrical will have a minor impact on the complete array. However, for smaller arrays comprising e.g. tens of antenna elements, symmetry will not be true for a majority of antenna elements.

It is important that an antenna system is calibrated in order to ensure its proper performance and there is a need for a calibration method functioning for antenna systems of different sizes.

SUMMARY

An objective of embodiments herein is to provide an improved calibration method for antenna arrays. A particular objective is to improve calibration accuracy for antenna systems, in particular for antenna systems wherein pure symmetry cannot be relied on. This objective, and others, is achieved by the method, network node, computer programs and computer program products according to the appended independent claims, and by the embodiments according to the dependent claims.

The objective is according to an aspect achieved by a method of calibrating an antenna system comprising a number of antenna elements. The method is performed in a control device and comprises transmitting a signal from a first reference antenna element selected among the antenna elements; measuring the signal in two or more calibration antenna elements selected among the remaining antenna elements, and obtaining a first set of corresponding number of measurement values; repeating the transmitting and measuring at least for a second reference antenna element different than the first reference antenna element, thereby obtaining a second set of corresponding number of measurement values; calculating for each calibration antenna element j a correction value based on the at least first and second sets of measurement values, thereby obtaining a correction matrix comprising for row i correction values for calibration antenna elements j relative antenna element k with antenna element i as the reference antenna element; performing an optimization procedure using as input the correction matrix, wherein each column, except one, is multiplied with a respective constant, thereby obtaining, for each row of the correction matrix, a respective optimized constant, and calculating a correction value for each antenna element based on the respective optimized constant.

The method brings about several advantages. For instance, the method gives a highly increased calibration accuracy compared to known symmetry based methods.

The objective is according to an aspect achieved by a computer program for a control device for calibrating an antenna system. The computer program comprises computer program code, which, when executed on at least one processor on the control device causes the control device to perform the method as above.

The objective is according to an aspect achieved by a computer program product comprising a computer program as above and a computer readable means on which the computer program is stored.

The objective is according to an aspect achieved by a control device for calibrating an antenna system comprising a number of antenna elements. The control device is configured to: transmit a signal from a first reference antenna element selected among the antenna elements; measure the signal in two or more calibration antenna elements selected among the remaining antenna elements, and obtaining a first set of corresponding number of measurement values; repeat the transmitting and measuring at least for a second reference antenna element different than the first reference antenna element, thereby obtaining a second set of corresponding number of measurement values; calculate for each calibration antenna element j a correction value, based on the at least first and second sets of measurement values, thereby obtaining a correction matrix comprising for row i correction values for calibration antenna elements j relative antenna element k with antenna element i as the reference antenna element; perform an optimization procedure using as input the correction matrix, wherein each column, except one, is multiplied with a respective constant thereby obtaining, for each row of the correction matrix, a respective optimized constant; and calculate a correction value for each antenna element based on the respective optimized constant.

Further features and advantages of the embodiments of the present teachings will become clear upon reading the following description and the accompanying drawings.

DETAILED DESCRIPTION

Figure 1:
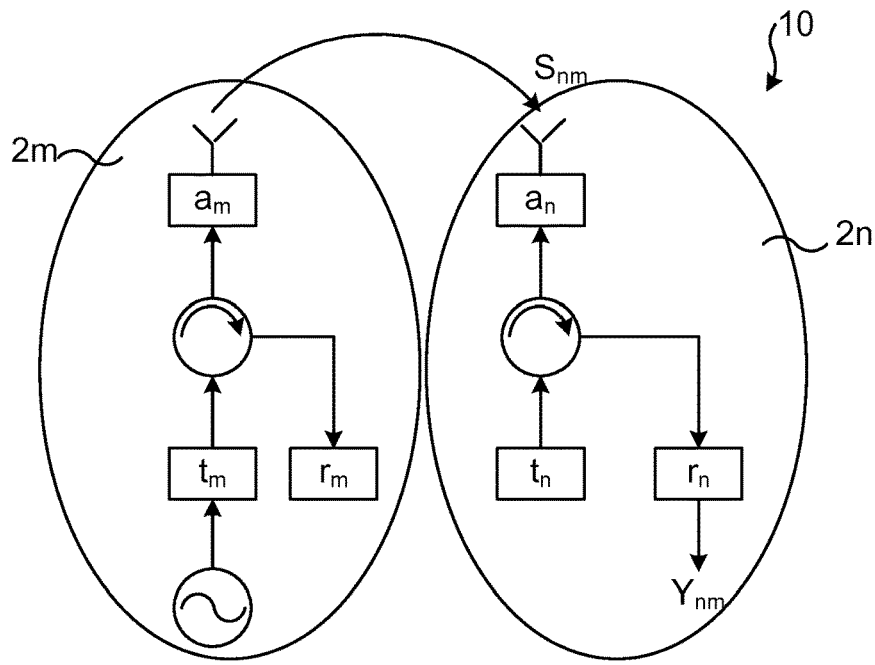
FIG. 1 illustrates an active antenna system.

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

Briefly, according to various embodiments herein, knowledge of a limited part of the antenna coupling matrix is used for calibrating an antenna array without relying on pure symmetry.

FIG. 1 illustrates an active antenna system. The antenna system 10 comprises a number of antenna branches $2m$, $2n$ (two shown in the figure), each comprising e.g. transmitting circuitry, receiving circuitry, antenna feed lines etc. In FIG. 1 a first antenna branch $2m$ and a second antenna branch $2n$ are shown. The first antenna branch $2m$ comprises a first transmitter $t_m$, a first receiver $r_m$, and a first antenna feed line $\alpha_m$. The first antenna branch $2m$ may comprise further components and circuitry, e.g. a circulator as shown in FIG. 1. The second antenna branch $2n$ comprises a second transmitter $t_n$, a second receiver $r_n$, and a second antenna feed line $\alpha_n$. The second antenna branch $2n$ may comprise further components and circuitry, e.g. a circulator as shown in FIG. 1.

A signal $Y_{nm}$ sent from the first transmitter $t_m$ of the first antenna branch $2m$ can be measured with the second receiver $r_n$ of the second antenna branch $2n$. The signal $Y_{nm}$ can then be written as:

$$Y_{nm} = t_m \cdot \alpha_m \cdot S_{nm} \cdot \alpha_n \cdot r_n, \forall n \neq m, \quad [1]$$

wherein the antenna is represented by a coupling matrix $S_{nm}$ and the antenna feed lines $\alpha_m$ and $\alpha_n$ of the respective antenna branches $2m$, $2n$.

The transmitter and receiver can be represented by the complex variables $t_m$ and $r_m$. These variables consist of the original state (uncalibrated) variables $t_{m0}$ and $r_m$ and calibration correction factors $\Delta t$ and $\Delta r$ according to the following equations:

$$t_m = t_{m0} \cdot \Delta t_m, \quad [2]$$

$$r_m = r_{m0} \cdot \Delta r_m, \quad [3]$$

It is noted that the corrections are time dependent. Measurements may be performed with "old" corrections. For instance, if a first correction is made and a new measurement shows that the result is still not according to a desired target value, then a new calibration is made, and the new correction may include the previous correction. Any new correction is thus based on the existing correction (if any).

The equations below show how a state variable $t_m$ ($t_1$) which included an original compensation $\Delta t_m$ ($t_1$) is used to calculate a new correction $\Delta t_m$ ($t_2$).

$$t_m(t_1) = t_{m0} \cdot \Delta t_m(t_1)$$

$$t_m(t_2) = (t_{m0} \cdot \Delta t_m(t_1)) \cdot \Delta t_m(t_2)$$

The desired state is that all radiated (in farfield) or received (from farfield) signals have the same amplitude and phase, i.e. the ratio between the state variables of any two antenna branches is ideally equal to 1. The error £ (complex) between branches m and n can therefore be calculated according to below equations [4] and [5] for downlink (DL) and uplink (UL), respectively.

$$\varepsilon_{mn}^{DL} = \frac{t_m \cdot a_m}{t_n \cdot a_n} \forall\, m \neq n \quad [4]$$

$$\varepsilon_{mn}^{UL} = \frac{r_m \cdot a_m}{r_n \cdot a_n} \forall\, m \neq n \quad [5]$$

The error $\varepsilon$ can be used to calculate corrections $\Delta t_n$, $\Delta r_n$ for antenna branch $2n$ according to below equations [6] and [7]:

$$\Delta t_n = \varepsilon_{mn}^{DL} \quad [6]$$

$$\Delta r_n = \varepsilon_{mn}^{UL} \quad [7]$$

Correction for element j relative element k using element i as reference can be calculated according to below equations [8] and [9]. This means in terms of UL calibration that element i is transmitting and that elements j and k are receiving the transmitted signal. The correction value is calculated for element j relative element k.

$$\Delta T_{ij}^k = \frac{t_k^i}{t_j^i} = \frac{Y_{ik} \cdot S_{ij}}{S_{ik} \cdot Y_{ij}} \forall\, i \neq j, k \quad [8]$$

$$\Delta R_{ij}^k = \frac{r_k^i}{r_j^i} = \frac{Y_{ki} \cdot S_{ji}}{S_{ki} \cdot Y_{ji}} \forall\, i \neq j, k \quad [9]$$

Figure 2:
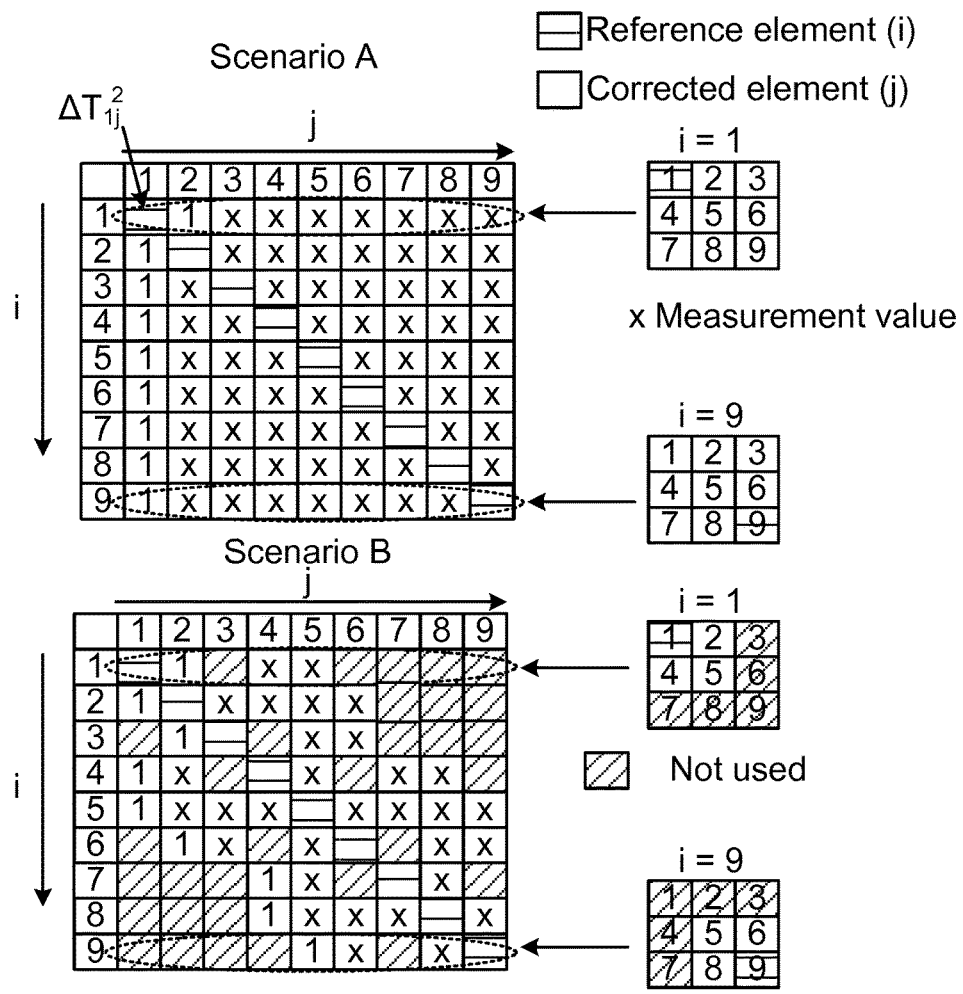
FIG. 2 illustrates two different measurement scenarios

FIG. 2 illustrates two different measurement scenarios, and in particular calibration scenarios for a 3×3 element array (these exemplary arrays shown at rightmost part of FIG. 2). In scenario A (uppermost part of FIG. 2) measurements are performed for a signal transmitted from the reference element and received by all other elements. The above equations [8] and [9] can then be used for calculating the correction for element j relative element k using element i as reference element.

For instance, for the 3×3 element array (right-hand side of FIG. 2) for scenario A, with reference element i=1, a signal is sent from the reference element 1 towards all other elements of the 3×3 element array. Measurements are then made in the other elements, i.e. the elements to be corrected in a calibration procedure (these elements being denoted "corrected elements" in FIG. 2, and also denoted calibration elements herein). The resulting measurement values are put into a measurement matrix. A signal sent from reference element 1 is received by corrected element 2, corrected element 3, corrected element 4, . . . , and corrected element 9 and measured in the corresponding antenna chains. The signal sent from element 1 may, for instance, be more phase shifted as received by the element 3, than as received by the element 9. This measurement procedure may then be repeated using each element as reference element in sequence.

In scenario B measurements are performed from the reference element to the adjacent elements. For instance, for the exemplifying 3×3 element array and using element 1 as reference element the signal sent from the reference element 1 is measured as received only by adjacent elements 2, 4 and 5.

The different measurement scenarios A, B may be chosen depending on the particular circumstances at hand. For instance, a decision for choosing one of the measurement scenarios may be based on signal-to-noise ratio (SNR) and/or difficulties to predict the coupling matrix s, at larger distances. This renders the calibration method according to the various embodiments described herein adaptable for the particular application at hand. For instance, the time needed for the measurements can be adapted, e.g. the measurement time is reduced if fewer corrected elements are used. On the other hand, the more measurements, the more accurate is the resulting calibration of the antenna system to.

Figure 3:
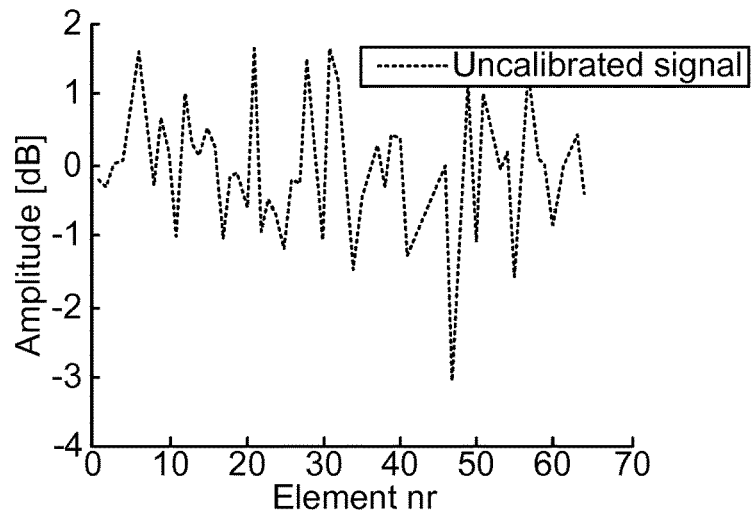
FIG. 3 illustrates a mathematical operation.

FIG. 3 illustrates a mathematical operation. The measurements can result in an over determined number of corrections, which can reduce the uncertainty of potential measurement errors and/or S-matrix errors if corrections are managed in a proper way. In different embodiments, each row of the measurement matrix is therefore multiplied with a constant $c_i$ as shown in FIG. 3.

After the multiplications, a least square optimization can then be performed to according to below expression [10] in order to find the proper $c_i$. It is however noted that other optimization procedures may be used, for instance performing a maximum likelihood estimation of the constants $c_i$.

$$\min_{c_i, i=1\ldots N} \left( \sum_{j=1}^{N} \sum_{a,b=1}^{N} |\Delta T_{aj} \cdot c_a - \Delta T_{bj} \cdot c_b|^2 \right), \quad [10]$$

wherein $\Delta T_{\alpha j}$ is the correction value in downlink for element j relative element $\alpha$.

Based on the optimized $c_i$ values, it is possible to calculate an optimized, in this case averaged, compensation term $\Delta t_i$ according to below equation [11]:

$$\Delta t_i = \frac{\sum_{j=1}^{N} \Delta T_{ij} \cdot c_i}{N}, \quad [11]$$

The described method provides an improved accuracy compared to other symmetry-based methods. Further, the method is suitable also for handling non-symmetrical arrays. In particular, the described method may be applied to antenna arrays, wherein the distance between the elements is arbitrary non-uniform, i.e. not truly symmetrical. Owing to the applied constants $c_i$ and the optimization thereof, the accuracy of the corrections values and hence the calibration can be highly improved. A least square method, or other optimization method, may be used for combining the corrections to be applied to obtain still higher calibration accuracy.

The described method, in various embodiments, has been implemented in Matlab and simulation results are given in the following. The S-matrix was calculated using a simple distance based equation. The array size has been arbitrarily chosen to 8×8 (64 elements). The nominal state of the transmitter and receiver is assumed to have uniform phase distribution (over 0-2π) and normal amplitude distribution with σ=1 dB.

Figure 4:
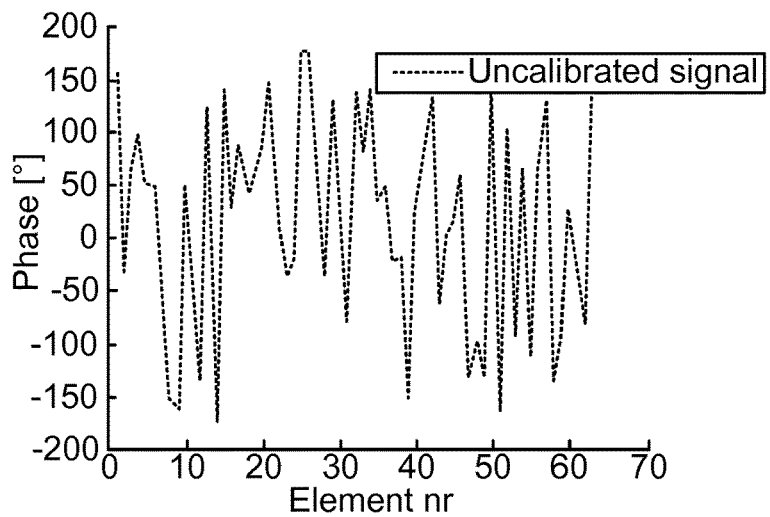
FIGS. 4, 5, 6 and 7 show simulation results.

FIG. 4 shows simulation results for nominal state amplitude (top graph) and phase (bottom graph) of branches 1-64.

Figure 5:
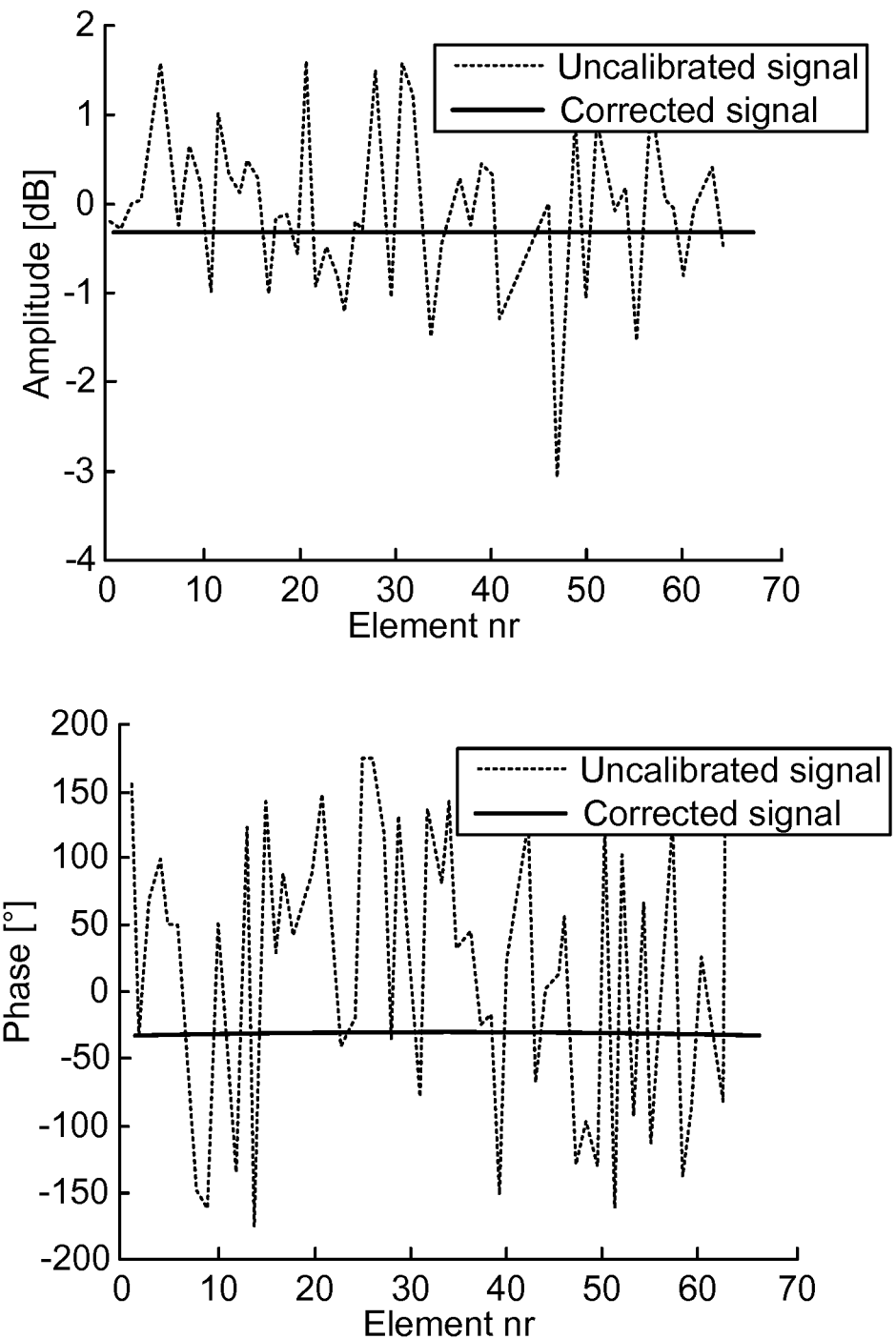

FIG. 5 shows the amplitude and phase after calibration. The calibration has been performed with nMax=1, where nMax is defined as the maximum radius in elements to be measured from the reference element. It is noted that only the relative difference between elements is of interest, the absolute values are not important, which may facilitate and speed up calculations.

Figure 6:
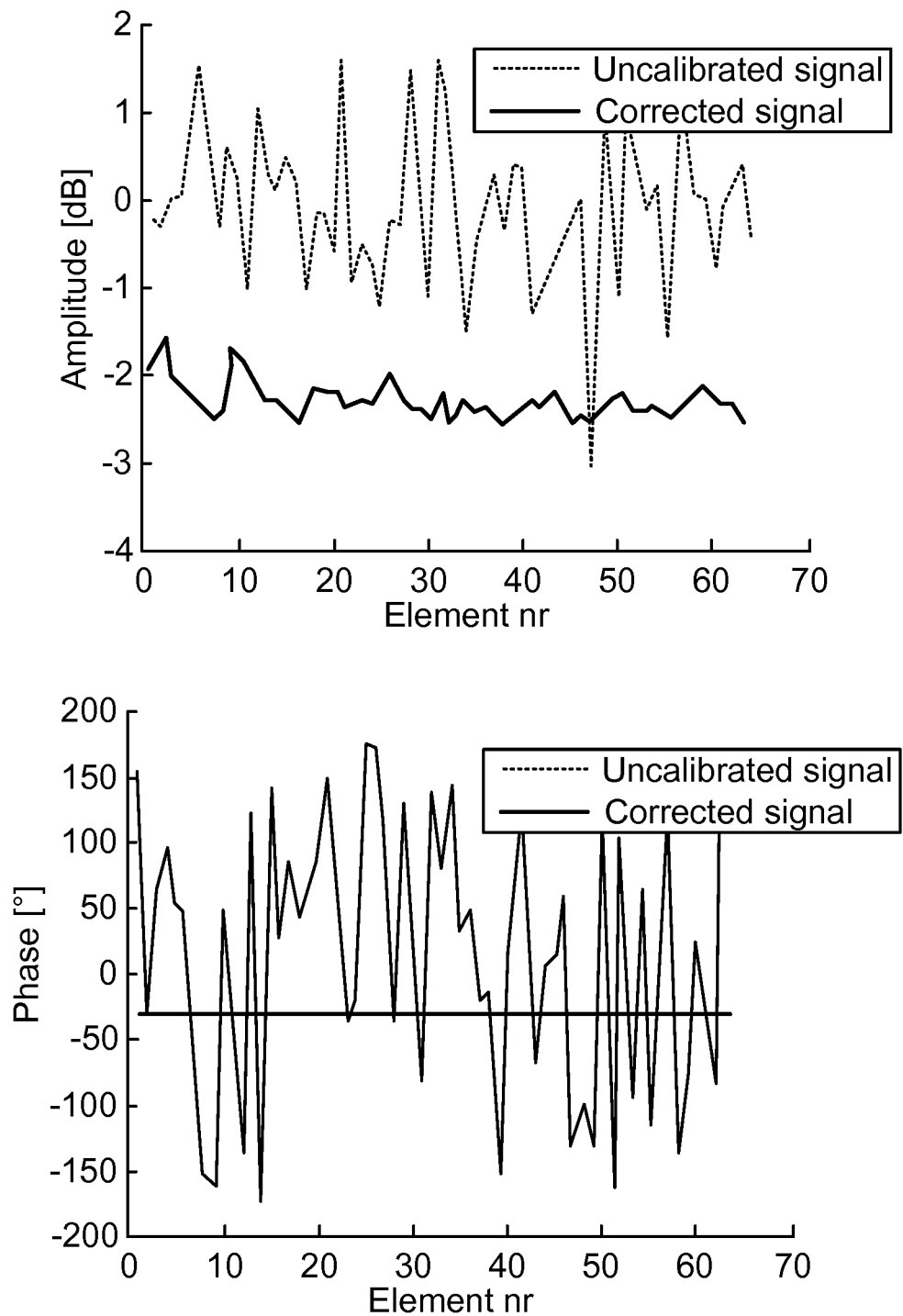

In FIG. 6 errors have been added to the S-matrix. The errors means that the true S-matrix was not estimated properly. From this figure it can be seen that the S-matrix errors generates errors in the calibrated signal.

Figure 7:
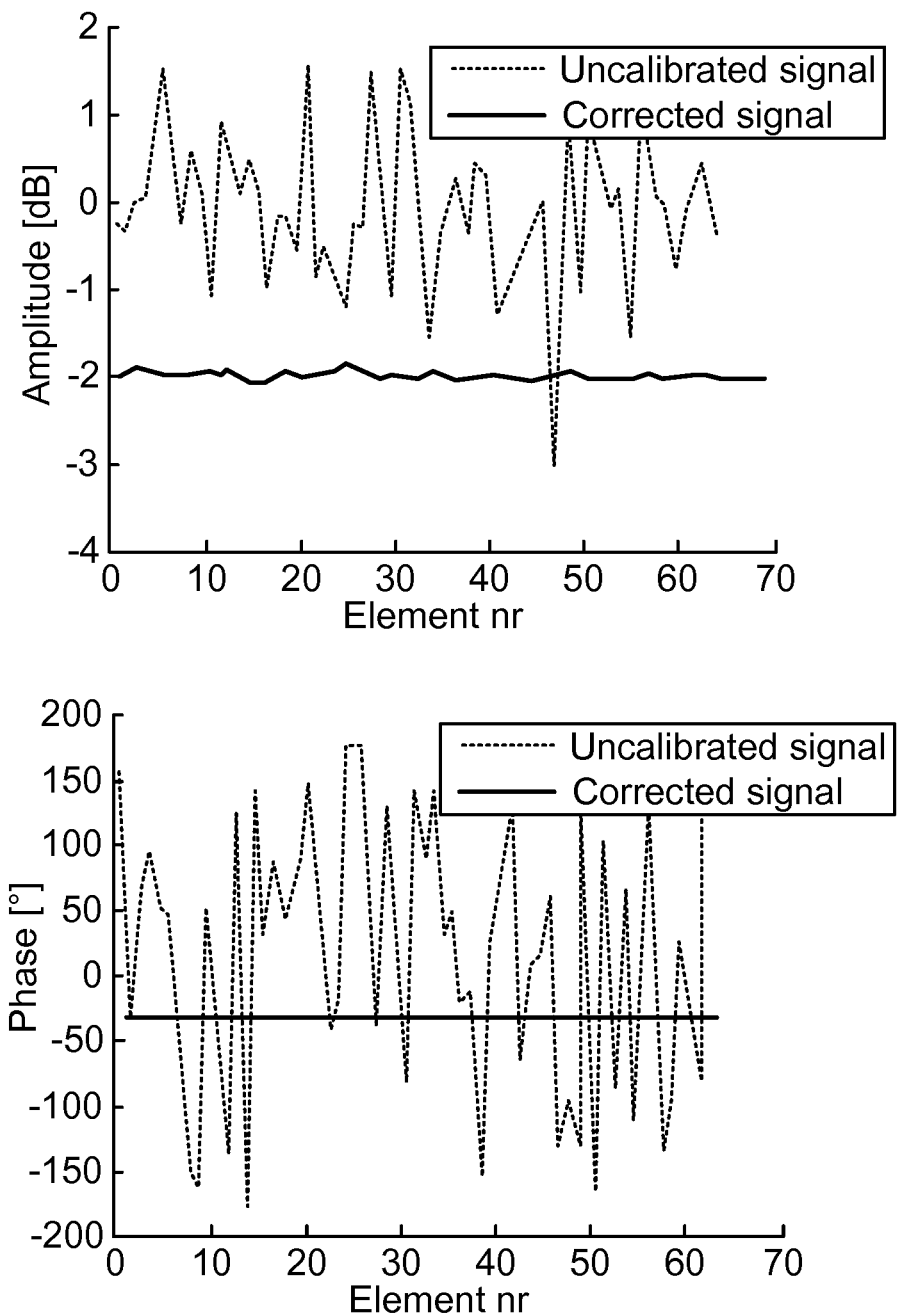

In FIG. 7 the measurement distance has been increased to nMax=$_3$. The results show that the calibration errors have been reduced even though that the S-matrix errors are the same. The reason for this is that "uncorrelated noise" of the multiple measurements used to estimate each compensation term is reduced.

Figure 8:
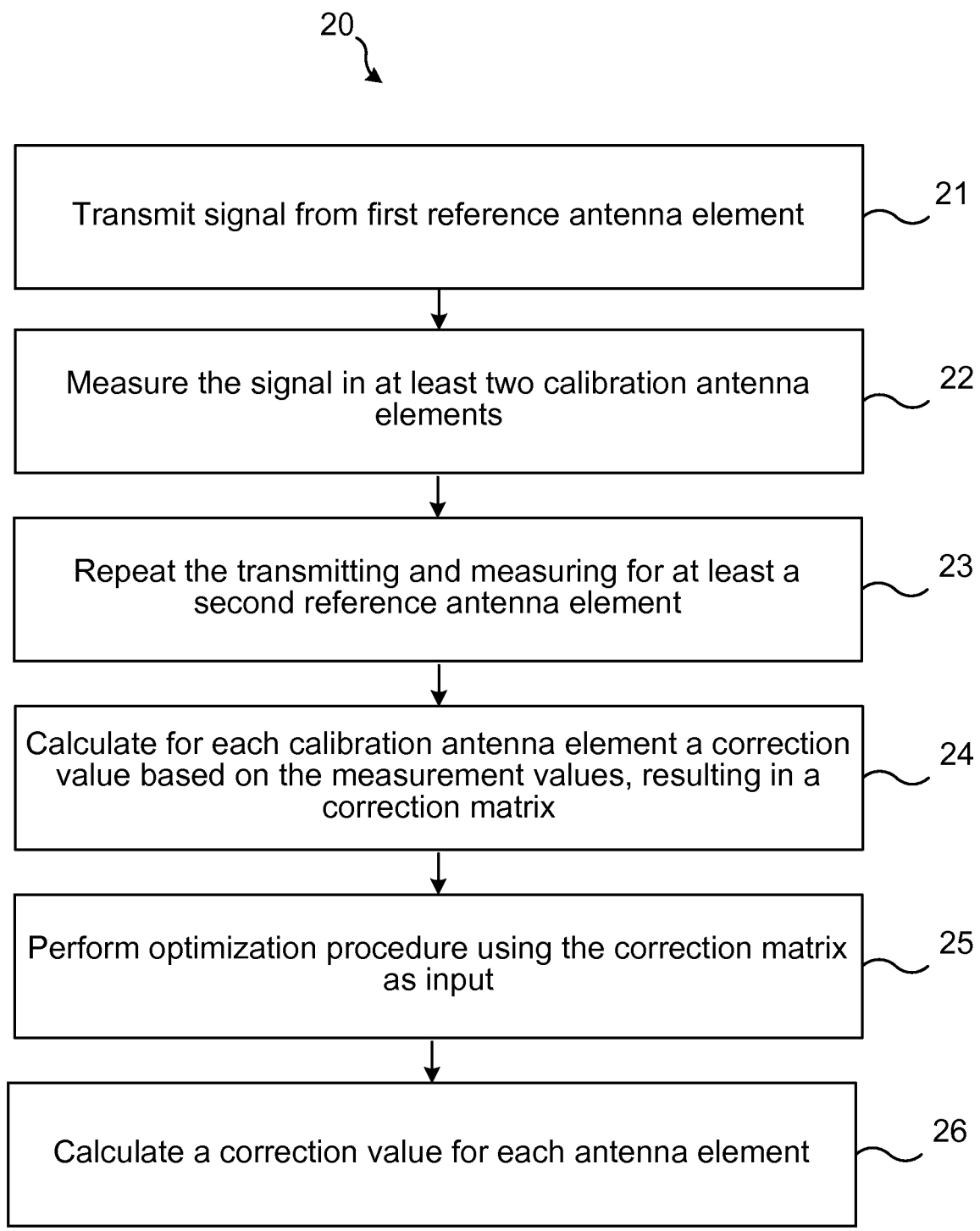
FIG. 8 illustrates a flow chart over steps of an embodiment of a method in a control device in accordance with the present teachings.

The various embodiments and features that have been described may be combined in different ways, examples of which are given next, with reference first to FIG. 8.

FIG. 8 illustrates a flow chart over steps of an embodiment of a method in a control device in accordance with the present teachings.

The method 20 of calibrating an antenna system to may be applied to different types of antenna systems 10. The antenna system to comprises a number of antenna elements, and the antenna arrays comprising these antenna elements may have any configuration. That is, the N antenna elements may be arranged in any type of array configurations, e.g. rectangular lattices. The method 20 may be performed in a control device 11.

The method 20 comprises transmitting 21 a signal from a first reference antenna element selected among the antenna elements.

The method 20 comprises measuring 22 the signal in two or more calibration antenna elements selected among the remaining antenna elements, and obtaining a first set of corresponding number of measurement values. Examples on the measuring were give e.g. with reference to FIG. 2.

The method 20 comprises repeating 23 the transmitting 21 and measuring 22 at least for a second reference antenna element different than the first reference antenna element, thereby obtaining a second set of corresponding number of measurement values. Different measurement scenarios are envisioned, and two such measurement scenarios were given with reference to FIG. 2.

The method 20 comprises calculating 24 for each calibration antenna element j a correction value $\Delta T_{ij}^k$, based on the at least first and second sets of measurement values, thereby obtaining a correction matrix comprising for row i correction values for calibration antenna elements j relative antenna element k with antenna element i as the reference antenna element.

The method 20 comprises performing 25 an optimization procedure using as input the correction matrix, wherein each column, except one, is multiplied with a respective constant $c_i$, thereby obtaining, for each row of the correction matrix, a respective optimized constant $c_i^{opt}$.

The method 20 comprises calculating 26 a correction value $\Delta t_i$ for each antenna element based on the respective optimized constant $c_i^{opt}$. The correction value $\Delta t_i$ that is calculated may, for instance, be an averaged correction value (see e.g. equation [11]).

The method 20 entails a number of advantages, for instance, a highly improved calibration accuracy is obtained compared to existing symmetry-based methods. Further, the method 20 may be performed at installation of an antenna system 10 and also later during operation thereof.

In an embodiment, the measuring 22 the signal is performed for each of the remaining antenna elements. That is, all antenna elements of the antenna system except the reference element that is transmitting the signal measures on the signal.

In an embodiment, the measuring 22 the signal is performed only for neighboring elements selected among the remaining antenna elements. One example of such measurement scenario was given with reference to FIG. 2 (Scenario B), but many other are conceivable.

In various embodiments, the calculating 24 the correction values $\Delta R_{ij}^k$ in uplink comprises calculating for correction antenna element j relative antenna element k with antenna element i as the reference antenna element, the correction values according to, $$\Delta T_{ij}^k = \frac{Y_{ik} \cdot S_{ij}}{S_{ik} \cdot Y_{ij}} \forall\, i \neq j, k,$$

wherein $S_{ij}$, $S_{jk}$ is a coupling matrix obtained based on the at least first and second sets of measurement values, $Y_{ik}$, and $Y_{ij}$ is the signal transmitted from reference antenna element i and received at elements k and j, respectively.

In various embodiments, the calculating 24 the correction values $\Delta R_{ij}^k$ in downlink comprises calculating for correction antenna element j relative antenna element k the correction values according to, $$\Delta R_{ij}^k = \frac{Y_{ki} \cdot S_{ji}}{S_{ki} \cdot Y_{ji}} \forall\, i \neq j, k,$$

wherein $S_{ij}$, $S_{ik}$ is a coupling matrix obtained based on the at least first and second sets of measurement values, $Y_{ik}$ and $Y_{ij}$ is the signal transmitted from reference antenna element i and received at elements k and j, respectively.

In various embodiments, the performing 25 the optimization procedure comprises performing a least square optimization using expression:

$$\min_{c_i, i=1 \ldots N} \left( \sum_{j=1}^{N} \sum_{a,b=1}^{N} |\Delta T_{aj} \cdot c_a - \Delta T_{bj} \cdot c_b|^2 \right),$$

Using least square optimization gives good results, as has been shown e.g. with reference to FIGS. 4-7, but other optimization procedures may alternatively be used.

In various embodiments, the calculating 26 an averaged compensation value $\Delta t_i$ for each antenna element i comprises using equation:

$$\Delta t_i = \frac{\sum_{j=1}^{N} \Delta T_{ij} \cdot c_i}{N}$$

Figure 9:
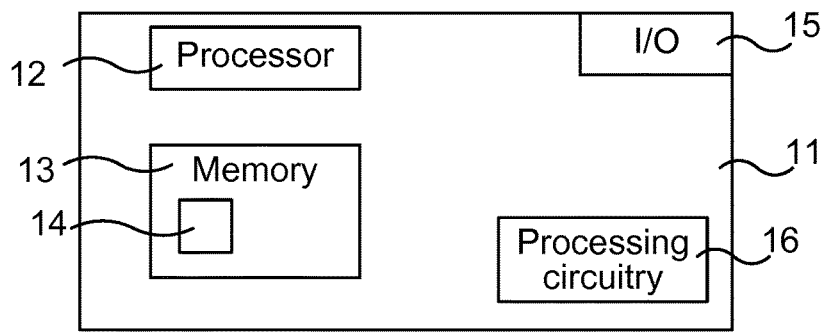
FIG. 9 illustrates schematically a control device and means for implementing embodiments of the method in accordance with the present teachings.

FIG. 9 illustrates schematically a control device and means for implementing embodiments of the method in accordance with the present teachings.

The control device 11 comprises a processor 12 comprising any combination of one or more of a central processing unit (CPU), multiprocessor, microcontroller, digital signal processor (DSP), application specific integrated circuit etc. capable of executing software instructions stored in a memory 13 which can thus be a computer program product. The processor 12 can be configured to execute any of the various embodiments of the method 10 for instance as described in relation to FIG. 8.

The memory 13 of the control device 11 can be any combination of read and write memory (RAM) and read only memory (ROM), Flash memory, magnetic tape, Compact Disc (CD)-ROM, digital versatile disc (DVD), Blu-ray disc etc. The memory 13 may also comprise persistent storage, which, for example, can be any single one or combination of magnetic memory, optical memory, solid state memory or even remotely mounted memory.

The control device 11 may comprise an interface 15 for communication with other devices. The interface 15 may, for instance, comprise a protocol stack, for communication with other devices or entities. The interface may be used for receiving data input and for outputting data.

The control device 11 may comprise additional processing circuitry, schematically indicated at reference numerals 16 for implementing the various embodiments according to the present teachings.

A control device 11 is provided for calibrating an antenna system 10 comprising a number of antenna elements. The control device 11 is configured to:

transmit a signal from a first reference antenna element selected among the antenna elements, measure the signal in two or more calibration antenna elements selected among the remaining antenna elements, and obtaining a first set of corresponding number of measurement values, repeat the transmitting and measuring at least for a second reference antenna element different than the first reference antenna element, thereby obtaining a second set of corresponding number of measurement values, calculate for each calibration antenna element j a correction value $\Delta T_{ij}^k$, based on the at least first and second sets of measurement values, thereby obtaining a correction matrix comprising for row i correction values for calibration antenna elements j relative antenna element k with antenna element i as the reference antenna element, perform an optimization procedure using as input the correction matrix, wherein each column, except one, is multiplied with a respective constant thereby obtaining, for each row of the correction matrix, a respective optimized constant $c_i^{opt}$, and calculate a correction value $\Delta t_i$ for each antenna element based on the respective optimized constant $c_i^{opt}$.

The control device 11 may be configured to perform the above steps e.g. by comprising one or more processors 12 and memory 13, the memory 13 containing instructions executable by the processor 12, whereby the control device 11 is operative to perform the steps. That is, in an embodiment, a control device 11 is provided for calibrating an antenna system 10 comprising a number of antenna elements. The control device 11 comprises one or more processors 12 and memory 13, the memory 13 containing instructions executable by the processor 12, whereby the control device 11 is operative to: transmit a signal from a first reference antenna element selected among the antenna elements, measure the signal in two or more calibration antenna elements selected among the remaining antenna elements, and obtaining a first set of corresponding number of measurement values, repeat the transmitting and measuring at least for a second reference antenna element different than the first reference antenna element, thereby obtaining a second set of corresponding number of measurement values, calculate for each calibration antenna element j a correction value $\Delta T_{ij}^{k}$ based on the at least first and second sets of measurement values, thereby obtaining a correction matrix comprising for row i correction values for calibration antenna elements j relative antenna element k with antenna element i as the reference antenna element, perform an optimization procedure using as input the correction matrix, wherein each column, except one, is multiplied with a respective constant thereby $c_i$, obtaining, for each row of the correction matrix, a respective optimized constant $c_i^{opt}$, and calculate a correction value $\Delta t_i$ for each antenna element based on the respective optimized constant $c_i^{opt}$.

In an embodiment, the control device 11 is configured to measure the signal for each of the remaining antenna elements.

In an embodiment, the control device 11 is configured to measure the signal only for neighboring elements selected among the remaining antenna elements.

In an embodiment, the control device 11 is configured to calculate the correction values $\Delta T_{ij}^{k}$ in uplink by calculating for correction antenna element j relative antenna element k with antenna element i as the reference antenna element, the correction values according to, $$\Delta T_{ij}^{k} = \frac{Y_{ik} \cdot S_{ij}}{S_{ik} \cdot Y_{ij}} \forall\ i \neq j, k,$$

wherein $S_{ij}$, $S_{jk}$ is a coupling matrix obtained based on the at least first and second sets of measurement values, $Y_{ik}$ and $Y_{ij}$ is the signal transmitted from reference antenna element i and received at elements k and j, respectively.

In an embodiment, the control device 11 is configured to calculate the correction values $\Delta R_{ij}^{k}$ in downlink by calculating for correction antenna element j relative antenna element k the correction values according to, $$\Delta R_{ij}^{k} = \frac{Y_{ki} \cdot S_{ji}}{S_{ki} \cdot Y_{ji}} \forall\ i \neq j, k,$$

wherein $S_{ij}$, $S_{ik}$ is a coupling matrix obtained based on the at least first and second sets of measurement values, $Y_{ik}$ and $Y_{ij}$ is the signal transmitted from reference antenna element i and received at elements k and j, respectively.

In an embodiment, the control device 11 is configured to perform the optimization procedure as a least square optimization and configured to use expression:

$$\min_{c_i, i=1 \ldots N} \left( \sum_{j=1}^{N} \sum_{a,b=1}^{N} |\Delta T_{aj} \cdot c_a - \Delta T_{bj} \cdot c_b|^2 \right),$$

In an embodiment, the control device 11 is configured to configured to calculate an averaged compensation value $\Delta t_i$ for each antenna element i by using equation:

$$\Delta t_i = \frac{\sum_{j=1}^{N} \Delta T_{ij} \cdot c_i}{N}$$

The present teachings also encompass a computer program 14 for a control device 11 for calibrating antenna systems. The computer program 14 comprises computer program code, which, when executed on at least one processor on the control device 11, causes the control device 11 to perform the method 10 according to any of the described embodiments.

The present teachings also encompass computer program products 13 for a control device 11. The computer program product 13 comprises the computer program 14 for implementing the embodiments of the methods as described, and a computer readable means on which the computer program 14 is stored. The computer program product, or the memory, thus comprises instructions executable by the processor 12. Such instructions may be comprised in a computer program, or in one or more software modules or function modules. The computer program product 13 may, as mentioned earlier, be any combination of random access memory (RAM) or read only memory (ROM), Flash memory, magnetic tape, Compact Disc (CD)-ROM, digital versatile disc (DVD), Blu-ray disc etc.

Figure 10:
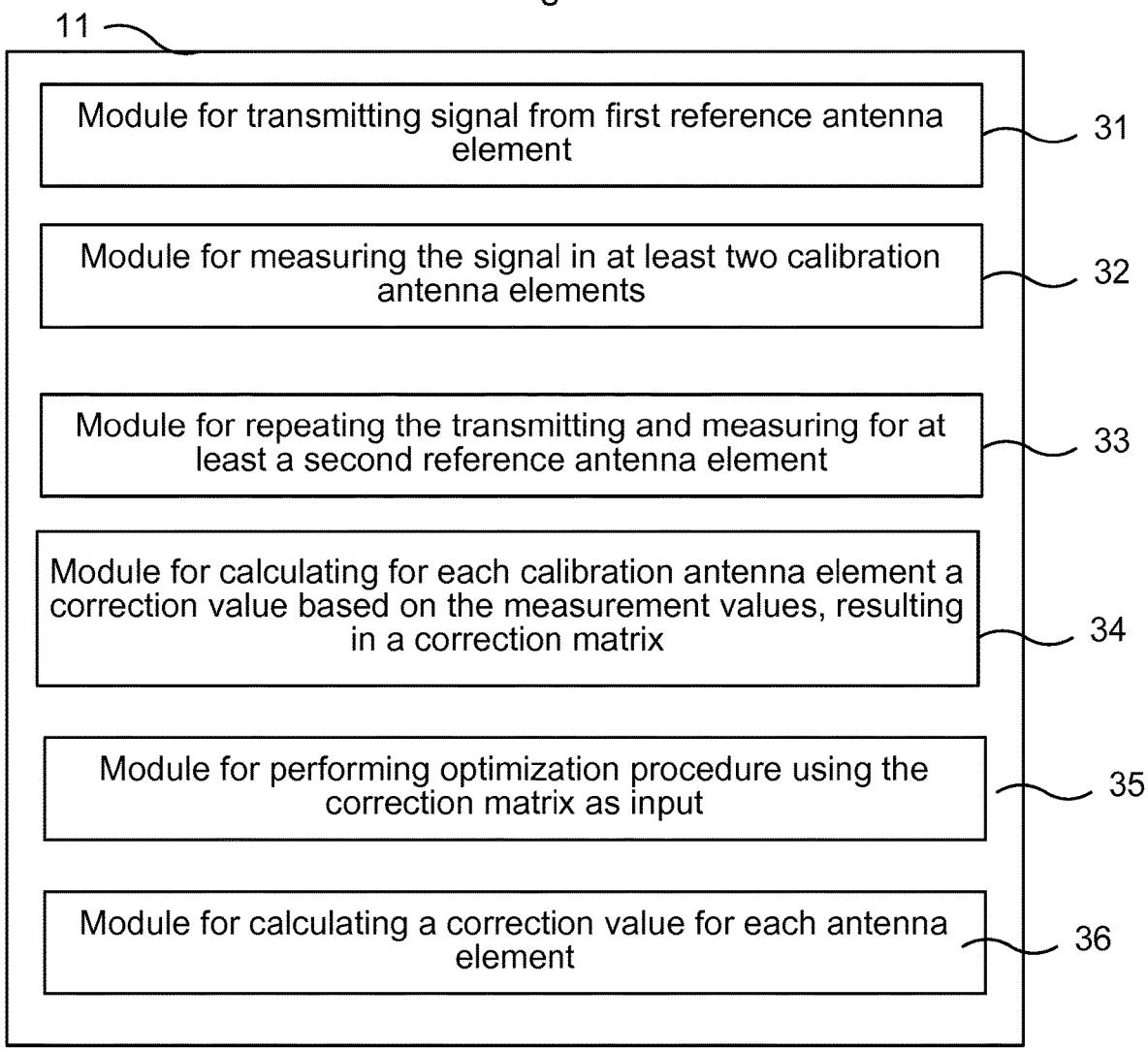
FIG. 10 illustrates a control device comprising function modules/software modules for implementing embodiments of the present teachings.

FIG. 10 illustrates a control device comprising function modules/software modules for implementing embodiments of the present teachings. The function modules can be implemented using software instructions such as computer program executing in a processor and/or using hardware, such as application specific integrated circuits (ASICs), field programmable gate arrays, discrete logical components etc., and any combination thereof. Processing circuitry may be provided, which may be adaptable and in particular adapted to perform any of the steps of the method 10 that has been described in various embodiments.

A control device is provided for calibrating an antenna system comprising a number of antenna elements. The control device comprises a first module 31 for transmitting a signal from a first reference antenna element selected among the antenna elements. Such first module may, for instance, comprise transmitting circuitry.

The control device comprises a second module 32 for measuring the signal in two or more calibration antenna elements selected among the remaining antenna elements, and obtaining a first set of corresponding number of measurement values. Such second module may, for instance, comprise processing circuitry adapted to perform measurements.

The control device comprises a third module 33 for repeating the transmitting and measuring at least for a second reference antenna element different than the first reference antenna element, thereby obtaining a second set of corresponding number of measurement values. Such third module 33 may, for instance, comprise processing circuitry adapted for repeating the transmitting and measuring by repeatedly activating the first and second modules 31, 32.

The control device comprises a fourth module 34 for calculating for each calibration antenna element j a correction value $\Delta T_{ij}^{k}$, based on the at least first and second sets of measurement values, thereby obtaining a correction matrix comprising for row i correction values for calibration antenna elements j relative antenna element k with antenna element i as the reference antenna element. Such fourth module 34 may, for instance, comprise processing circuitry adapted for such calculations.

The control device comprises a fifth module 35 for performing an optimization procedure using as input the correction matrix, wherein each column, except one, is multiplied with a respective constant $c_i$, thereby obtaining, for each row of the correction matrix, a respective optimized constant $c_i^{opt}$. Such fifth module 35 may, for instance, comprise processing circuitry adapted for executing an optimization procedure, e.g. processing circuitry adapted to execute a least square optimization.

The control device comprises a sixth module 36 for calculating a correction value $\Delta t_i$ for each antenna element based on the respective optimized constant $c_i^{opt}$. Such sixth module 36 may comprise processing circuitry adapted for such calculation.

It is noted that one or more of the modules 31, 32, 33, 34, 35, 36 may be replaced by units.

The invention has mainly been described herein with reference to a few embodiments. However, as is appreciated by a person skilled in the art, other embodiments than the particular ones disclosed herein are equally possible within the scope of the invention, as defined by the appended patent claims.

The invention claimed is:

1. A method of calibrating an antenna system comprising a number of antenna elements, the method being performed in a control device and comprising:
transmitting a signal from a first reference antenna element selected among the antenna elements,
measuring the signal in two or more calibration antenna elements selected among the remaining antenna elements, and obtaining a first set of corresponding number of measurement values,
repeating the transmitting and measuring at least for a second reference antenna element different than the first reference antenna element, thereby obtaining a second set of corresponding number of measurement values,
calculating for each calibration antenna element j a correction value $\Delta T_{ij}^k$, based on the at least first and second sets of measurement values, thereby obtaining a correction matrix comprising for row i correction values for calibration antenna elements j relative antenna element k with antenna element i as the reference antenna element,
performing an optimization procedure using as input the correction matrix, wherein each column, except one, is multiplied with a respective constant $c_i$, thereby obtaining, for each row of the correction matrix, a respective optimized constant $c_i^{opt}$, and
calculating a correction value $\Delta t_i$ for each antenna element based on the respective optimized constant $c_i^{opt}$.

2. The method of claim 1, wherein the measuring the signal is performed for each of the remaining antenna elements.

3. A computer program product comprising a non-transitory computer readable medium storing a computer program for a control device for calibrating an antenna system, the computer program comprising computer program code, which, when executed on at least one processor on the control device causes the control device to perform the method of claim 2.

4. The method of claim 1, wherein the measuring the signal is performed only for neighboring elements selected among the remaining antenna elements.

5. The method of claim 1, wherein the calculating the correction values $\Delta T_{ij}^k$ in uplink comprises calculating for correction antenna element j relative antenna element k with antenna element i as the reference antenna element, the correction values according to, $$\Delta T_{ij}^k = \frac{Y_{ik} \cdot S_{ij}}{S_{ik} \cdot Y_{ij}} \forall i \neq j, k,$$

wherein $S_{ij}$, $S_{ik}$ is a coupling matrix obtained based on the at least first and second sets of measurement values, $Y_{ik}$, and $Y_{ij}$ is the signal transmitted from reference antenna element i and received at elements k and j, respectively.

6. The method of claim 1, wherein the calculating the correction values $\Delta R_{ij}^k$ in downlink comprises calculating for correction antenna element j relative antenna element k the correction values according to, $$\Delta R_{ij}^k = \frac{Y_{ki} \cdot S_{ji}}{S_{ki} \cdot Y_{ji}} \forall i \neq j, k,$$

wherein $S_{ij}$ $S_{ik}$ is a coupling matrix obtained based on the at least first and second sets of measurement values, and $Y_{ik}$, $Y_{ij}$ is the signal transmitted from reference antenna element i and received at elements k and j, respectively.

7. The method of claim 1, wherein the performing the optimization procedure comprises performing a least square optimization using expression:

$$\min_{c_i, i=1 \ldots N} \left( \sum_{j=1}^{N} \sum_{a,b=1}^{N} |\Delta T_{aj} \cdot c_a - \Delta T_{bj} \cdot c_b|^2 \right).$$

8. The method of claim 1, wherein the calculating an averaged compensation value $\Delta t_i$ for each antenna element i comprises using equation:

$$\Delta t_i = \frac{\sum_{j=1}^{N} \Delta T_{ij} \cdot c_i}{N}.$$

9. A computer program product comprising a non-transitory computer readable medium storing a computer program for a control device for calibrating an antenna system, the computer program comprising computer program code, which, when executed on at least one processor on the control device causes the control device to perform the method of claim 1.

10. A control device for calibrating an antenna system comprising a number of antenna elements, the control device being configured to:
transmit a signal from a first reference antenna element selected among the antenna elements,
measure the signal in two or more calibration antenna elements selected among the remaining antenna elements, and obtaining a first set of corresponding number of measurement values, repeat the transmitting and measuring at least for a second reference antenna element different than the first reference antenna element, thereby obtaining a second set of corresponding number of measurement values, calculate for each calibration antenna element j a correction value $\Delta T_{ij}^{k}$, based on the at least first and second sets of measurement values, thereby obtaining a correction matrix comprising for row i correction values for calibration antenna elements j relative antenna element k with antenna element i as the reference antenna element, perform an optimization procedure using as input the correction matrix, wherein each column, except one, is multiplied with a respective constant $c_i$, thereby obtaining, for each row of the correction matrix, a respective optimized constant $c_i^{opt}$, and calculate a correction value $\Delta t_i$ for each antenna element based on the respective optimized constant $c_i^{opt}$.

11. The control device of claim 10, configured to measure the signal for each of the remaining antenna elements.

12. The control device of claim 10, configured to measure the signal only for neighboring elements selected among the remaining antenna elements.

13. The control device of claim 10, configured to calculate the correction values $\Delta T_{ij}^{k}$ in uplink by calculating for correction antenna element j relative antenna element k with antenna element i as the reference antenna element, the correction values according to, $$\Delta T_{ij}^{k} = \frac{Y_{ik} \cdot S_{ij}}{S_{ik} \cdot Y_{ij}} \forall\ i \neq j, k,$$

wherein $S_{ij}$, $S_{ik}$ is a coupling matrix obtained based on the at least first and second sets of measurement values, $Y_{ik}$, and $Y_{ij}$ is the signal transmitted from reference antenna element i and received at elements k and j, respectively.

14. The control device of claim 10, configured to calculate the correction values $\Delta R_{ij}^{k}$ in downlink by calculating for correction antenna element j relative antenna element k the correction values according to, $$\Delta R_{ij}^{k} = \frac{Y_{ki} \cdot S_{ji}}{S_{ki} \cdot Y_{ji}} \forall\ i \neq j, k,$$

wherein $S_{ij}$, $S_{ik}$ is a coupling matrix obtained based on the at least first and second sets of measurement values, and $Y_{ik}$, $Y_{ij}$ is the signal transmitted from reference antenna element i and received at elements k and j, respectively.

15. The control device of claim 10, configured to perform the optimization procedure as a least square optimization and configured to use expression:

$$\min_{c_i, i=1\ldots N} \left( \sum_{j=1}^{N} \sum_{a,b=1}^{N} |\Delta T_{aj} \cdot c_a - \Delta T_{bj} \cdot c_b|^2 \right).$$

16. The control device of claim 10, configured to calculate an averaged compensation value $\Delta t_i$ for each antenna element i by using equation:

$$\Delta t_i = \frac{\sum_{j=1}^{N} \Delta T_{ij} \cdot c_i}{N}.$$

* * * * *